United States Patent

[11] 3,611,370

[72] Inventors Lawrence R. Frasure
Orange;
Walter Rudolf Fried, Santa Ana, both of Calif.
[21] Appl. No. 773,485
[22] Filed Nov. 5, 1968
[45] Patented Oct. 5, 1971
[73] Assignee North American Rockwell Corporation
El Segundo, Calif.

[54] DUAL-MODE RADAR SYSTEM
19 Claims, 5 Drawing Figs.
[52] U.S. Cl. .................................................. 343/7.5,
343/7, 343/9
[51] Int. Cl. .................................................. G01s 9/10
[50] Field of Search .......................................... 343/7, 7.5, 9

[56] References Cited
UNITED STATES PATENTS
| 3,005,980 | 10/1961 | Meyer | 343/9 X |
| 3,239,837 | 3/1966 | Fried | 343/9 |
| 3,271,763 | 9/1966 | Colby | 343/7.5 |
| 3,334,344 | 8/1967 | Colby | 343/7.5 |

*Primary Examiner*—Rodney D. Bennett, Jr.
*Assistant Examiner*—T. H. Tubbesing
*Attorneys*—William R. Lane, L. Lee Humphries and Rolf M. Pitts ABSTRACT: A dual-mode radar velocity sensor and altimeter useful over a wide range of radar altitudes and comprising a single common transmitter arranged for operation in an alternative one of a 50-percent duty cycle interrupted continuous wave (ICW) mode and a Bessel sideband FM-CW mode, in cooperation with switching means responsive to radar range for selecting the ICW mode under radar range conditions greater than a preselected range and selecting the FM-CW mode under radar range conditions less than such preselected radar range.

FIG. 1

INVENTORS
LAWRENCE R. FRASURE
WALTER R. FRIED

BY

ATTORNEY

FIG. 2 — ELEMENT 28 IN DETAIL

FIG. 3 — ELEMENTS 21 AND 22 IN DETAIL

FIG. 4 — ELEMENT 58 IN DETAIL

FIG. 5

DUAL-MODE RADAR SYSTEM

BACKGROUND OF THE INVENTION

In the application of radar systems as velocity sensors and altimeters i.e., terminal rate-of-descent indicators in space-borne vehicle planetary descent control systems, it is necessary to effectively determine the range (altitude) and velocity of the vehicle at extremely high altitudes in initiating terminal guidance control of the vehicle trajectory, and also to accurately measure the vehicle altitude and velocity at extremely low altitudes in the critical phase of approach and touchdown of the terminal trajectory. Such terminal trajectory guidance control employs altitude rate (or rate of descent) as a control parameter, for trajectory rate-damping and control purposes.

The requirements for each of a long range altimeter and short range altimeter are somewhat anomalous and, therefore, have been provided in the prior art by separate altimeter and/or velocity sensor systems, each particularly adapted to a mutually exclusive one of such altimetry ranges. For example, the short range altimetry function, requiring extreme accuracy, may be performed by a Bessel sideband FM-CW-type system as described, for example, in U.S. Pat. No. 3,199,102 issued to N. M. Papanicolaou for FM Doppler Radar Navigation System and U.S. Pat. No. 3,182,323 issued to O. K. Nilssen for Continuous Wave Radar System. Because of the lesser ranges for which such systems may be used, high transmitter power levels are not required.

Further descriptions of such FM-CW systems for both ranging and doppler velocity computation are provided in chapter 3 of the text *Radar Systems* by Skolnik, published by McGraw-Hill (1962.)

The long-range altimetry function, on the other hand, while not requiring the same degree of precision as the short range altimetry function, requires a greater amount of transmitted energy in order to obtain an adequate echo return from the range-distances of interest. Also, the use of the Bessel sideband FM-CW technique for both doppler velocity determination and ranging at high altitudes gives rise to ambiguities and spectral overlap conditions: high altitudes or long ranges require low modulation frequencies in order to avoid ambiguities in altitude measurement, while the high vehicle velocities associated with such portion of the vehicle trajectory give rise to large doppler frequencies which result in spectrum overlap.

A more efficient altimetry technique for use at long range (or high altitudes) is a 50 percent duty cycle interrupted continuous wave (ICW) technique, also called a high duty-ratio coherent pulse technique. By means of this technique, the system duty-cycle ratio (transmitted pulse width to system pulse repetition interval) is automatically maintained at 50 percent by adjustment of both the pulse repetition frequency and the transmitted pulse width, the doppler shift of a fixed-frequency carrier being measured for velocity determinations and the pulse repetition frequency being indicative of radar range. Because of the efficiency of the ICW technique, adequate energy return echoes may be obtained at long ranges without unusually high energy level transmitters. However, such ICW technique has severe performance limitations at short radar ranges because of the extremely high pulse repetition rates and extremely short pulse rise times required and associated difficult and high-tolerance pulse-gating problems.

A further description of the ICW technique is included in an article "A Coherent Solid State Radar for Rendevous and Planetary Landings" by H. Goldberg and J. L. Burroughs, in the Proceedings of the National Conference on Space Electronics, Oct. 1963, sponsored by IEEE.

A disadvantage in attempting to install both such systems for alternative use in a space-borne vehicle is the associated payload penalty. Also, the use of separate antennas reduces the allowable antenna aperture and resultant antenna gain.

SUMMARY OF THE INVENTION

By means of the concept of the subject invention, a dual-mode radar system is provided which utilizes both the short range performance advantages of the Bessel sideband FM-CW technique and the long range performance advantages of the ICW technique, while effecting certain design economies.

In a preferred embodiment of the inventive concept, there is provided a multimode velocity sensing and altimeter radar system useful over a wide range of radar altitudes and comprising a single common transmitter arranged for operation in an alternative one of an interrupted continuous wave mode and a Bessel sideband FM-CW mode. There is also provided mode switching means responsive to radar range for selecting the interrupted continuous wave (ICW) mode under radar range conditions greater than a preselected range and selecting the FM-CW mode under radar range conditions less than such preselected radar range.

In normal operation of the above-described arrangement, a single common antenna may be employed for both transmission and range reception in both of the two system modes of operation, whereby payload penalties are reduced and antenna gain may be maximized in effecting such wide range radar function. In addition, a single common range-receiver may be employed for cooperation with both modes of transmission by the single common RF source, whereby further economies are effected. Moreover, common doppler processing means may be employed with both transmission modes for obtaining radar platform velocity data. Accordingly, it is an object of the invention to provide an improved radar doppler velocity sensor and altimeter.

It is another object of the invention to provide a dual-mode velocity measuring radar and altimeter effective over a wide range of radar altitudes.

It is a further object to provide a doppler velocity measuring radar and altimeter operable in an alternative one of an interrupted continuous wave mode and a FM-CW mode.

Still another object is to provide a multimode doppler velocity radar and altimeter employing a minimum of equipment for effective use in a space-borne vehicle

BRIEF DESCRIPTION OF THE DRAWINGS

These and other objects of the invention will become apparent from the following description, taken together with the accompanying drawings, in which.

In the figures, like reference characters refer to like parts.

DESCRIPTION OF THE PREFERRED EMBODIMENTS

Figure 1:
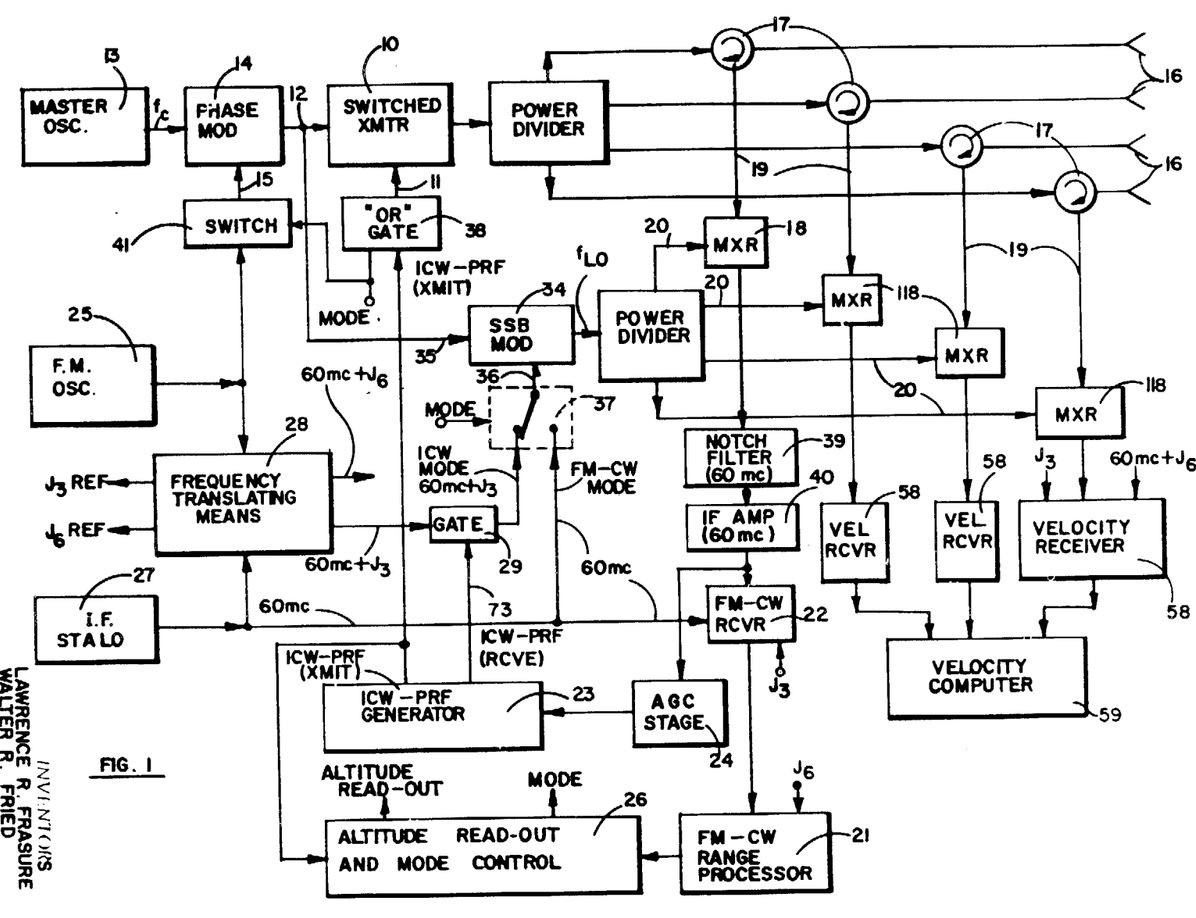
FIG. 1 is a block diagram of a system embodying the inventive concept.

Referring now to FIG. 1, there is illustrated in block diagram form a system embodying the concept of the invention. There is provided switchable and modulatable transmitter means comprising a switchable transmitter 10 having a switch control input 11 and further having a second RF input 12 responsively coupled to the output of an RF master oscillator 13 by means of a voltage-controlled phase-modulating means 14 having a control input 15. Transmitter 10 is coupled to a plurality of feeds 16 of an antenna (such as, for example, a luneberg lens) by circulators 17 or like transmit-receive means.

There is also provided a first or range channel intermediate frequency (IF) receiver stage comprising a mixer 18 having a first input 19 coupled to one of the circulators 17 and further having a local oscillator input 20. An FM-CW range processor 21 is responsively coupled to an output of the range channel IF receiver stage by an FM-CW receiver 22, as shown in greater particularity in FIG. 4. An ICW pulse repetition frequency (PRF) generator 23 is also responsively connected to such output of the range channel IF receiver stage by an automatic gain control (AGC) video detection stage 24, and provides a two-state output corresponding to a respective transmit and receive state. A continuous wave oscillator 25 is coupled by switch 41 for control of phase modulator 14, whereby an FM-CW mode may be obtained. Mode control means 26, responsive to the pulse repetition rate of generator 23 and to the output of FM-CW processor 21, provides a readout indicative of range (or altitude) and also a two-state mode control signal indicative of whether the radar range R is greater or less than a preselected radar range state.

Figure 2:
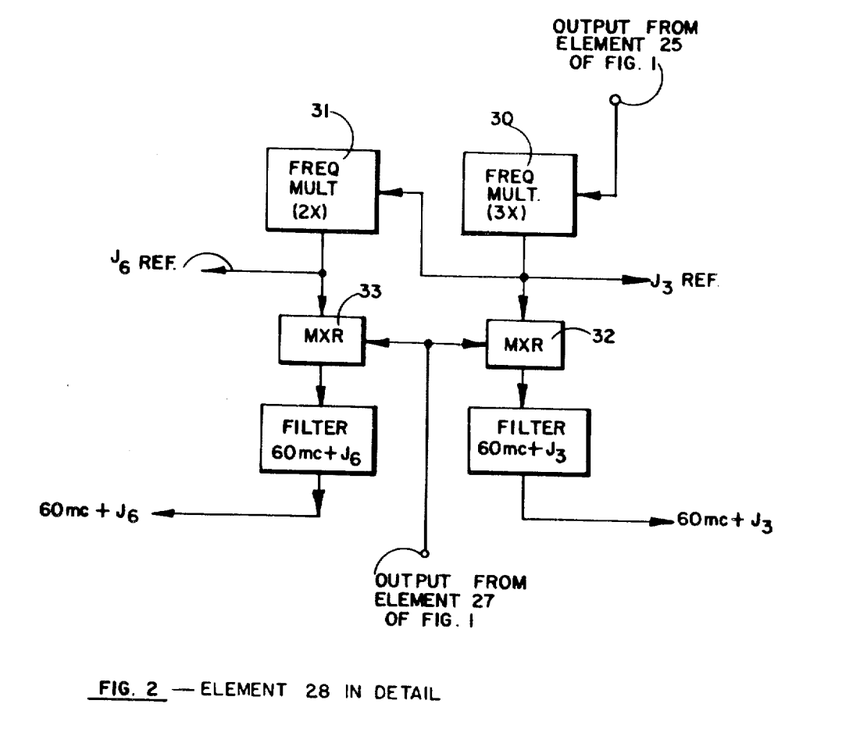
FIG. 2 is a block diagram, in further detail, of an exemplary embodiment of the frequency translating means of FIG. 1.

Also shown in the arrangement of FIG. 1 is an IF STALO 27 and frequency-translating means 28 (illustrated more fully in FIG. 2). Frequency-translating means 28 is coupled to both oscillator 25 and STALO 27 for providing a plurality of outputs: a first output having a frequency $J_3$ REF corresponding to a third-order Bessel function, a second output having a frequency $J_6$ REF corresponding to a sixth-order Bessel function, a third output having a frequency (60 mc.+$J_3$) corresponding to the sum of the STALO frequency and the third-order Bessel function, and a fourth output having a frequency (60 mc.+$J_6$) corresponding to the sum of the STALO frequency and the sixth-order Bessel function. The third output (60 mc.+$J_3$) of frequency-translating means 28 is gated by a signal gate 29 having a gate control input 73 responsively coupled to ICW PRF generator 23 for gating-on such third output only during a receive state of the ICW-PRF generator cycle, for reasons which will be more fully explained hereinafter. Frequency-translating means 28 may be seen, from FIG. 2, to comprise a first frequency multiplier 30 responsively coupled to oscillator 25 for providing the $J_3$ REF output, a second multiplier 31 responsively coupled to multiplier 30 for providing the $J_6$ REF output, a first mixer 32 having respective inputs coupled to multiplier 30 and STALO 27 respectively for providing the (60 mc.+$J_3$) output, and a second mixer 33 having respective inputs coupled to multiplier 31 and STALO 27 for providing the (60 mc.+$J_6$) output.

There is further provided in the arrangement of FIG. 1 dual-mode local oscillator (LO) injection means providing a source of a local oscillator frequency at the local oscillator input 20 of range receiver-mixer 18. Such LO injection means comprises a single-sideband modulator 34 having a first input 35 coupled to the continuous wave source 14 for transmitter 10 and also having a second input 36 coupled to an output of an alternative one of gate 29 and STALO 27 by a double-throw switch 37 having a switch control input responsive to the two-state mode control signal output of element 26.

In normal operation of the above-described arrangement of FIG. 1, a first state of the mode control signal, indicative of a range condition less than the preselected range ($R<R_o$), provides an FM-CW system mode by switching (at switch 41) the FM-CW modulation input to modulator 14, switching on transmitter 10 via an OR gate 38 and switching the IF reference input (from STALO 27) into SSB modulator 34 via switch 37. Thus, in the FM-CW mode, the L.O. frequency at LO input 20 of receiver mixer 18 is the sum of the carrier frequency and STALO frequency ($f_{LO}=f_c+60$ mc.). In other words, the FM-CW L.O. spectrum is displaced from the transmitted spectrum by the preselected STALO frequency ($f_{IF}=60$ mc.) employed as a center frequency of the IF receiver stage. However, in order to reduce any leakage energy from STALO 27 occurring in the range channel IF receiver stage, a notch filter 39 is employed.

In a second state indicative of a range condition greater than the preselected range ($R>R_o$), the mode control signal from element 26 switches off the modulating input to modulator 14 via switch 41, removes the mode enable signal from OR gate 38, and operates switch 37 to connect input 36 of SSB modulator 34 to the gated output of gate 29, thus providing an ICW system mode. In such mode, transmitter 10 is operated or switched on during the "transmit" condition of the two-state output of generator 23 (applied to OR gate 38). In other words, transmitter 10 is switched off only during the "receive" condition of the ICW mode. The gated L.O. frequency output, provided by the dual mode L.O. injection means during the ICW mode, is the sum, $f_o=f_c+60$ mc.+$J_3$. The $J_3$ offset of the L.O. injection in the ICW mode is intended to provide a compensated ICW mode IF receiver spectrum which is compatible with that of the FM-CW mode, whereby a single common range channel IF receiver stage may be employed in both modes.

Figure 3:
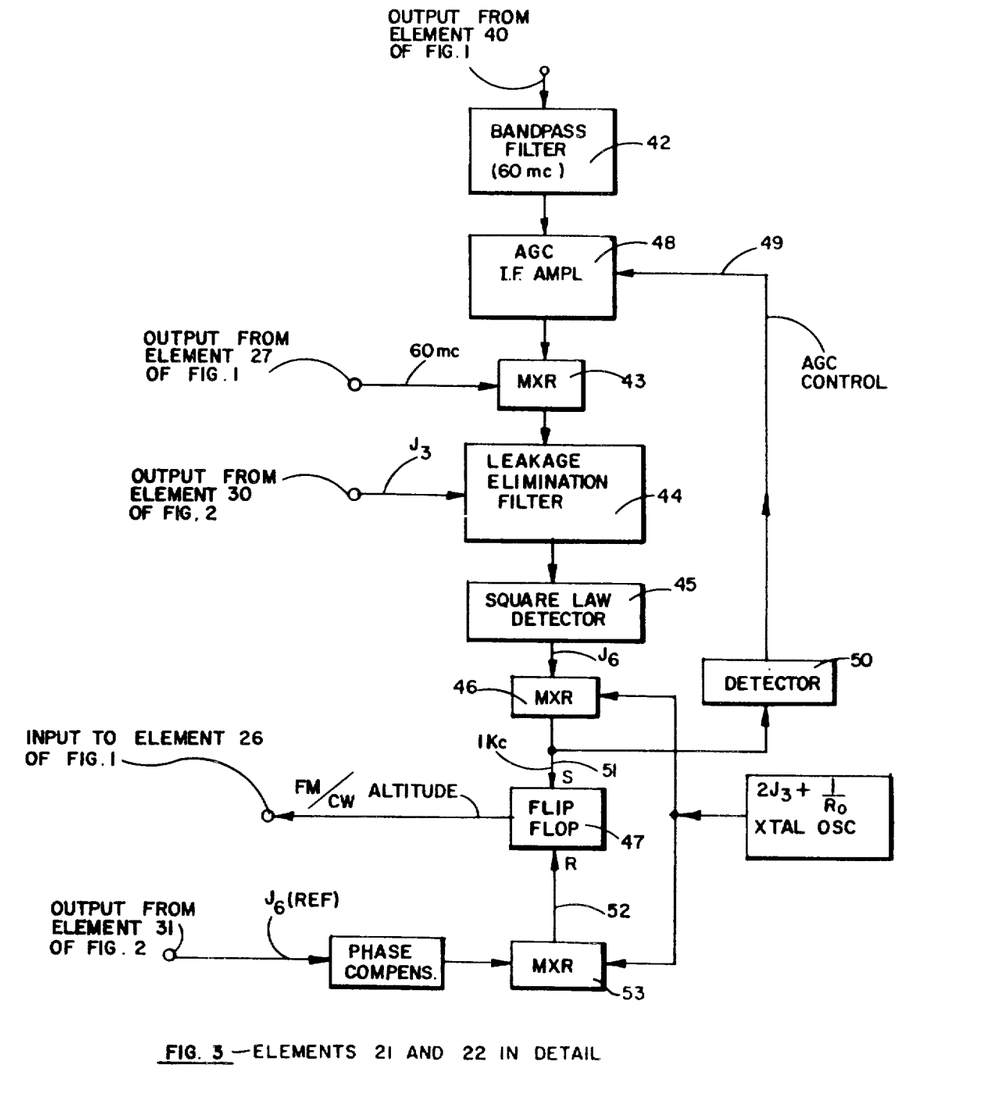
FIG. 3 is a block diagram in further detail of the FM-CW receiver of FIG. 1.

An exemplary mechanization of elements 21 and 22 of FIG. 1 is shown in further detail in FIG. 3, in which there is illustrated in block diagram form, an IF band-pass filter 42 to accommodate the upper and lower third order Bessel sidebands imparted by the mixing of the FM-CW LO signal and the received FM-CW echo signal (corresponding to a delayed and doppler shifted sample of the transmitted signal). A first mixer-filter 43, responsively coupled to an output of filter 42 and further having a local oscillator input coupled to the 60 mc. output of element 27 (of FIG. 1), provides an output indicative of the doppler shifted third-order Bessel sideband of the FM-CW mode. Any leakage energy present at the $J_3$ frequency may be attenuated by a leakage elimination filter 44 having a modulation input coupled to the output of multiplier 30 of FIG. 2. The output of filter 44 is then subjected to a square law-detector 45, which results in spectral foldover and cancellation of the doppler shift effect, as will be explained more fully in connection with FIG. 5.

The output of nonlinear detector 45 includes a frequency-multiplied spectral component (nominally, frequency-doubled in the case of perfect square law detection), the phase of which varies as a function of radar range or altitude. By further mixing (at mixer 46), the frequency of such component may be reduced to about 1 kc. or lower for more convenient range processing by a flip-flop 47. Such frequency-reduced output may also be used by receiver gain control means comprising a gain-controlled amplifier 48 interposed between filter 42 and mixer 43 and having a gain-control input 49 responsively coupled to the output of mixer 46 by a detector 50.

Range processor flip-flop 47 has a set input 51 coupled to the frequency reduced receiver output of mixer 46 and also has a reset input 52 coupled to a similarly reduced frequency reference, provided by a mixer 53 coupled to the $J_6$ output of element 31 of FIG. 2 and having a local oscillator input coupled with that of mixer 46. Thus, flip-flop 47 cooperates as a synchronous detector to provide a periodic output, the pulse width of which varies as a function of radar range, as is understood in the art.

Figure 5:
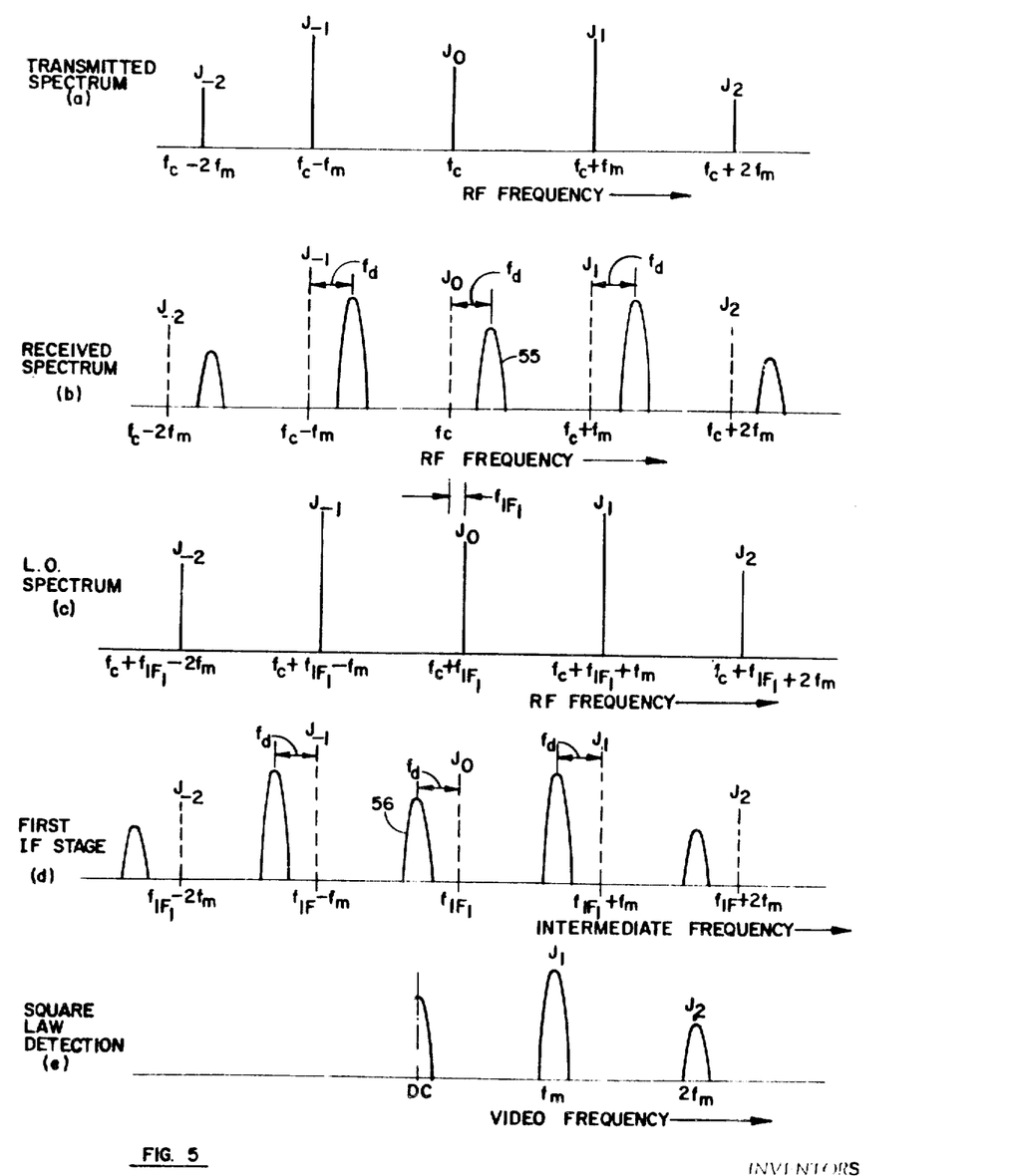
FIG. 5 is a family of spectral diagrams, illustrating the responses of various elements of the system of FIG. 1.

Such operation of the FM-CW altimetry mode may be further appreciated by reference to FIG. 5 in which there is illustrated a family of representative spectral responses of various portions of the system of FIGS. 1, 2 and 3 in the FM-CW mode. Waveform (a) of FIG. 5 illustrates the transmitted spectrum, illustrating the Bessel sidebands occurring about the carrier frequency $f_c$ in response to the modulation imparted by the modulating frequency $f_m$ of oscillator 25 (of FIG. 1), while waveform (b) of FIG. 5 shows the cusps 55 or spectral spread of the echo signals, demonstrating the doppler shift and spectral spread associated with the combined effects of platform relative motion and antenna beamwidth, as is understood in the art, for a range-closing condition. Waveform (c) of FIG. 5 shows the L.O. spectrum of the FM-CW mode, corresponding to the transmitted spectrum waveform (a) of FIG. 5 and frequency-translated therefrom by the offset frequency ($f_{IF}=60$ mc.) provided by STALO 27 of FIG. 1.

The spectral output of mixer 18 (in FIG. 1) in the FM-CW mode is illustrated by waveform (d) of FIG. 5, as the L.O. spectrum waveform (c) of FIG. 5 minus the received spectrum waveform (b) of FIG. 5, whereby the received spectrum (cusps 56) is spaced about the intermediate center frequency $f_{IF}$ and oppositely doppler shifted relative thereto. Square law detection (by detector 45 in FIG. 3) serves to fold the spectrum of waveform (d) of FIG. 5 about the centroid thereof ($f_{IF}-f_d$) and to result in certain beat frequency components in which the effect of any doppler shift is cancelled. For example, the illustrated $(f_{IF_1} -f_m-f_d)$ component beats with the $(f_{IF_1} +f_m-f_d)$ component to provide at least a sum frequency component $2f_m$ corresponding to the Bessel sideband $J_2$. In the case of the doppler-shifted $J_3$ and $J_{13}$ sidebands of the IF signal, such square law detection (with filtering) provides a doubled-frequency component corresponding to a $J_6$ sideband, as indicated at the output of element 45 in FIG. 3.

A further description of the FM-CW technique, including doppler velocity processing as well as altimetry, is included in an article entitled "FM-CW Radar for Velocity and Altitude Measurement," by W. R. Fried, at pages 45–57 of the *IEEE Transactions on Aerospace and Navigations Electronics* for March 1964.

There is further included in the arrangement of FIG. 1 three like velocity channels, each comprising a mixer 118 having a first input 19 coupled to a mutually exclusive one of differently oriented antennas 16 and further having a local oscillator input 20 coupled to the output of SSB modulator 34. An IF output of each of mixers 118 is coupled to a mutually exclusive one of a plurality of like velocity receivers 58 for providing a component velocity signal from which a velocity vector may be computed by a velocity computer 59, as is well understood in the art.

Figure 4:
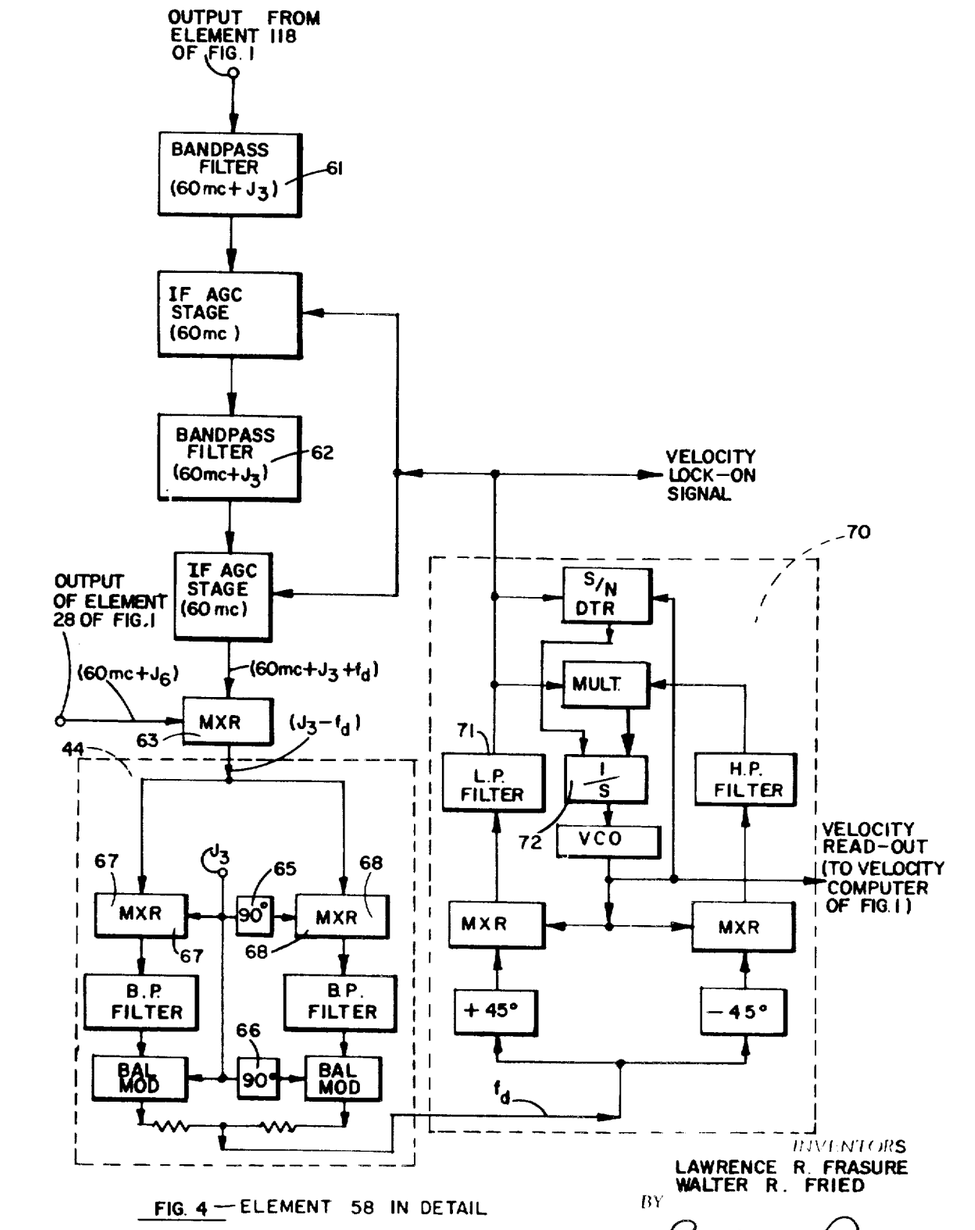
FIG. 4 is a block diagram in further detail of one of the doppler receivers of FIG. 1.

Each velocity receiver 58 is comprised of a tuned IF stage, a leakage elimination filter and a doppler frequency tracker, as shown more particularly in FIG. 4. The tuned IF stage, comprising band-pass filters 61 and 62, is tuned to a center frequency $(f_{IF_1}+J_3)$ corresponding to the output frequency $(f_{IF})$ of STALO 27 plus a preselected one (preferably the third order, $J_3$) of the Bessel function sidebands transmitted in the FM-CW mode. Such center frequency also corresponds to the intermediate frequency difference between the transmitted carrier and L.O. frequencies of the ICW mode, as explained above in connection with the description of the range channel receiver. Thus, the filter provided by such IF stage isolates a particular doppler-shifted spectral component (60 mc.$+J_3+f_d$), which may be further processed to extract the doppler data.

Such further processing involves further frequency translation and filtering by a filter-mixer 63 having a signal input responsively coupled to an output of filter 62 and further having a local oscillator input responsively coupled to the filtered output (60 mc.$+J_6$) of mixer 33 of FIG. 2, corresponding to the fourth output of element 28 of FIG. 1. The difference frequency output $(J_3-f_d)$ of mixer-filter 63 thus represents the spectral difference between the $J_3$ Bessel sideband and the doppler shift, $f_d$. Such Bessel function sideband (and any other spurious spectral content) may be removed by means of a leakage elimination filter 44, corresponding to that in FIG. 3 and shown in more detail in FIG. 4 as comprising dual-channel means commonly coupled to the output of mixer 63 and having a mutually quadrature time-phase relationship provided by phase shifters 65 and 66. There is further included a first and second filter mixer 67 and 68, each having a respective first input coupled to an output of a mixer-filter 63 and further having a local oscillator input responsive to the $J_3$ output of multiplier 30 of FIG. 2, corresponding to the first output of element 28 in FIG. 1. The outputs of mixers 67 and 68 are then filtered and combined by respective balanced modulators to provide a spectral output indicative of the doppler shift $f_d$, the energy level of which is substantially insensitive to variations in the time-phase relationship of the applied input to filter 44 relative to the $J_3$ reference LO input to mixers 67 and 68.

The doppler frequency output of leakage elimination filter 44 is applied to a doppler frequency tracker 70 for generating an analog output indicative of the velocity components corresponding to the doppler frequency shift sensed by the particular velocity receiver channel with which such tracker is associated. The construction and arrangement of various forms of such doppler frequency trackers is known in the art, as indicated for example by FIG. 14 in the above cited IEEE article "FM-CW Radar for Velocity and Altitude Measurement" and also in U.S. Pat. No. 3,341,847. In the exemplary arrangement of dotted block 70 of FIG. 4, dual mixer channels are operated in mutual time phase quadrature relationship, and the outputs thereof phase detected and integrated (by cooperation of elements 71 and 72) to drive a voltage-controlled local oscillator (VCO) in such a sense as to drive the DC component output of element 71 to a null.

The video detected low-pass channel signal level of frequency tracker 70, being indicative of the doppler signal of interest, may be further used for gain control of the band-pass limited intermediate frequency receiver channel, as illustrated in FIG. 4.

Accordingly, there has been demonstrated a fully integrated dual-mode radar system having alternative ICW and FM-CW modes of operation and achieving substantial design economies in equipment requirements. Such economies are effected by means of selected transmitter mode switching, compensatory local oscillator offset frequency translation and receiver band-pass limiting, as to allow sharing of common equipment between such separate modes of operation. In this way, optimum utilization and performance are obtained from such equipment over a wide range of radar altitudes.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A multimode radar system useful over a wide range of radar altitudes and comprising in combination
    a single common transmitter arranged for operation in an alternative one of a 50 percent duty cycle-interrupted continuous wave mode and a Bessel sideband FM-CW mode; and
    mode-switching means responsive to radar range for selecting said interrupted continuous wave mode under radar range conditions greater than a preselected range and selecting said FM-CW mode under radar range conditions less than said preselected radar range.

2. The device of claim 1 in which there is provided receiver local oscillator injection means comprising:
    a stable local oscillator for providing a source of a preselected intermediate frequency;
    frequency translation means responsive to said stable local oscillator and to a Bessel function generator of said FM-CW mode for providing a first output corresponding to a third-order Bessel function, a second output corresponding to a sixth-order Bessel function, a third output corresponding to the sum of said preselected intermediate frequency and said third-order Bessel function, and a fourth output corresponding to the sum of said preselected intermediate frequency and said sixth-order Bessel function;
    single-sideband modulating means for generating a receiver local oscillator signal being responsive to a continuous wave source of said transmitter and alternatively responsive to said third output of said frequency translation means during said interrupted continuous wave mode and to said preselected intermediate frequency during said FM-CW mode.

3. The device of claim 2 in which there is further provided gating means responsive to, said mode switching means during said interrupted continuous wave mode for gating on said third output of said frequency translation means during an interrupted state of said interrupted continuous wave mode.

4. The device of claim 2 in which there is further provided a single common velocity-receiver for use in both modes of operation of said multimode radar system and comprising:
    a first receiver-mixer having a local oscillator input responsive to said local oscillator injection means for providing an intermediate frequency receiver signal;

band-pass filter means responsive to said intermediate frequency receiver signal and having a tuned center frequency equal to the sum of said preselected intermediate frequency and said third-order Bessel function;

a second receiver-mixer having a local oscillator first input responsive to said fourth output of said signal translation means and further having a second input responsively coupled to an output of said band-pass filter means; and doppler frequency tracking means responsively coupled to an output of said second receiver mixer for providing an analog signal output indicative of the doppler velocity of a detected target.

5. The device of claim 4 in which there is further provided leakage elimination filter means interposed between said doppler frequency tracking means and said output of said second receiver mixer and responsive to said first output of said frequency translation means for reducing signal energy components other than those due to a received target signal.

6. The device of claim 4 in which there is further provided leakage elimination filter means, comprising:

dual-channel means commonly coupled to an output of said second receiver mixer for providing a first and second receiver signal having a mutually quadrature time phase relationship, said dual-channel means including a first and second filter mixer, each responsive to a mutually exclusive one of said first and second receiver signals and further commonly responsive to said first output of said frequency-translating means;

first and second low-pass filter means, each responsively coupled to an output of a mutually exclusive one of said first and second filter mixer; and signal combining means responsively coupled to said low-pass filter means for providing a signal output having a frequency indicative of the doppler velocity of a detected target.

7. The device of claim 4 in which there is further included automatic gain control means in series circuit with said band-pass filter means and having a gain control input responsive to the signal level of the received target signal in said doppler frequency tracking means.

8. A multimode radar system useful over a wide range of radar altitudes for providing both doppler velocity and range (distance) information, and comprising in combination a single common source of radio energy to be transmitted;

a high duty-ratio coherent pulse system in cooperation with said source;

a Bessel sideband FM-CW system in cooperation with said source; and mode-switching means responsive to radar range for coupling said transmitter to said high duty-ratio coherent pulse system at radar ranges greater than a preselected radar range and coupling said transmitter to said FM-CW system at radar ranges less than said preselected range.

9. The device of claim 8 in which there is further provided a single common intermediate frequency receiver channel for coupling a received signal to a respective range processor of said high duty-ratio coherent pulse system and said FM-CW system, said receiver channel having a local oscillator input; and dual-mode local oscillator injection means having an output coupled to the local oscillator input of said receiver channel and being responsive to said mode-switching means for compensatorily frequency translating the local oscillator frequency input of said receiver channel during an interrupted portion of the operation of said high duty-ratio coherent pulse system, whereby the intermediate frequency received signal bandwidths of the two modes of said multimode radar are mutually compatible.

10. The device of claim 8 in which there is further provided:

an intermediate frequency receiver channel adapted to be responsive to a received signal and having a local oscillator input;

a doppler frequency tracker responsive to an output of said receiver channel;

dual-mode local oscillator injection means having an output coupled to the local oscillator input of said receiver channel and being responsive to said mode-switching means for compensatorily frequency translating the local oscillator frequency input of said receiver input of said receiver channel during an interrupted portion of the operation of said high duty-ratio coherent pulse system, whereby the bandwidths of the intermediate frequency receiver signals of said two modes of said multimode radar are mutually compatible.

11. The device of claim 10 in which said intermediate frequency receiver channel further includes bandwidth-limited frequency-translating means interposed at the output thereof for reducing said receiver signal to a frequency corresponding to a doppler shift of said receiver signal.

12. A multimode radar system having a high duty-ratio coherent pulse mode of operation at radar altitude conditions greater than a preselected altitude and a Bessel sideband FM-CW mode at radar altitude conditions less than said preselected altitude, and comprising in combination:

a voltage-controlled RF oscillator having a control input;

a switchable pulse modulator arranged for pulse modulation of the output of said voltage controlled oscillator;

a switchable FM-CW oscillator for frequency modulation of said RF oscillator;

a high-duty cycle interrupted continuous wave pulse repetition frequency generator having a first input coupled to an output of said pulse modulator and further having a second input and an output;

FM-CW range-processing means having an input and an output;

a receiver having a switchable local oscillator input and output coupled to an input of an alternative one of said pulse repetition frequency generator and said range-processing means;

local oscillator means input coupled to said pulse modulator and having an output switchable coupled to said switchable input of said receiver;

range computer means having an input switchably coupled to the output of an alternative one of said pulse repetition frequency generator and said range processing means for generating a two-state control output indicative of a radar range condition relative to a preselected radar range, for switching control of said switchable elements.

13. The device of claim 12 in which such switchable elements are arranged to cooperate in response to a first state of said control output whereby said FM-CW oscillator is coupled for frequency modulation of said RF oscillator, said pulse modulator continuously output couples the output of said voltage controlled oscillator, said local oscillator input of said receiver is responsively coupled to said local oscillator means, said output of said receiver is drivingly coupled to said input of said range processor, and said input of said range computer is drivingly coupled to the output of said range processor.

14. The device of claim 12 in which said switchable elements are arranged to cooperate in response to a second state of said control output whereby said pulse modulator is responsively coupled to an output of said pulse repetition frequency generator for pulse modulation of the output of said RF oscillator, said input of said range computer is responsively coupled to said output of said pulse repetition frequency generator, and said second input of said pulse repetition frequency generator is responsively coupled to the output of said receiver.

15. A multimode radar system useful over a wide range of radar altitudes and comprising in combination:

switchable and modulatable transmitter means;

an intermediate frequency receiver stage having a local oscillator input;

a frequency-modulated continuous wave range processor responsively coupled to said receiver stage;

an interrupted continuous wave pulse repetition frequency generator responsive to said receiver stage for providing a two-state output corresponding to a respective transmit state and receive state;

a continuous wave oscillator for modulating said modulatable transmitter means;

an intermediate frequency stable local oscillator for providing a first local oscillator modulating frequency;

gated second intermediate-frequency-modulating means responsively coupled to said stable local oscillator and to said continuous wave oscillator for providing a gated second local oscillator modulating frequency, said frequency means being further responsive to a receive state of said output of said pulse repetition frequency generator;

mode control means responsive to said pulse repetition frequency generator and to said range processor for providing a two-state mode control signal indicative of a preselected radar range state; and dual-mode local oscillator injection means including a single-sideband modulator having a first input responsive to a modulatable carrier frequency of said transmitter means and further having a switchable modulation input responsive to an alternative one of said local oscillator modulating frequencies, said local oscillator injection means further having a switch control input responsive to said mode control means, a preselected one of said first and second modulating frequencies being coupled to said modulation input in response to a preselected state of said mode control signal, said transmitter means being further arranged to be switched off in response to said receive state of said pulse repetition frequency generator and to be modulated by said continuous wave oscillator in response to a preselected state of said mode control signal.

16. The device of claim 15 in which there is further provided a single common velocity-receiver for use in both modes of operation of said multimode radar system and comprising:

a first velocity receiver-mixer having a local oscillator input responsive to said local oscillator injection means for providing an intermediate frequency receiver signal;

band-pass filter means responsive to said intermediate frequency receiver signal and having a tuned center frequency equal to the sum of said preselected intermediate frequency and a third-order Bessel function;

a second receiver-mixer having a local oscillator first input responsive to the sum of said preselected intermediate frequency and a sixth-order Bessel function and further having a second input responsively coupled to an output of said band-pass filter means; and doppler frequency tracking means responsively coupled to an output of said second receiver mixer for providing an analog signal output indicative of the doppler velocity of a detected target.

17. The device of claim 16 in which there is further provided leakage elimination filter means interposed between said doppler frequency tracking means and said output of said second receiver mixer and responsive to said third-order Bessel function for reducing signal energy components other than those due to a received target signal.

18. The device of claim 16 in which there is further provided leakage elimination filter means, comprising:

dual-channel means commonly coupled to an output of said second receiver mixer for providing a first and second receiver signal having a mutually quadrature time phase relationship, said dual-channel means including a first and second filter mixer, each responsive to a mutually exclusive one of said first and second receiver signals and further commonly responsive to said third-order Bessel function;

first and second low-pass filter means, each responsively coupled to an output of a mutually exclusive one of said first and second filter mixer; and signal combining means responsively coupled to said low-pass filter means for providing a signal output having a frequency indicative of the doppler velocity of a detected target.

19. The device of claim 16 in which there is further included automatic gain control means in series circuit with said band-pass filter means and having a gain control input responsive to the signal level of the received target signal in said doppler frequency tracking means.